(12) United States Patent
Teranishi et al.

(10) Patent No.: US 6,726,239 B1
(45) Date of Patent: Apr. 27, 2004

(54) AIR BAG COVER ASSEMBLY

(75) Inventors: Sadao Teranishi, Aichi (JP); Takuya Kurimoto, Aichi (JP)

(73) Assignee: Mitsuboshi Belting Ltd., Kobe (JP)

( * ) Notice: Subject to any disclaimer, the term of this patent is extended or adjusted under 35 U.S.C. 154(b) by 0 days.

(21) Appl. No.: 09/668,670

(22) Filed: Sep. 22, 2000

(30) Foreign Application Priority Data

Sep. 22, 1999 (JP) .......................... 11-267944

(51) Int. Cl.⁷ .................... B60R 21/20; B60R 21/16
(52) U.S. Cl. .................... 280/728.3; 280/732
(58) Field of Search ................ 280/728.3, 731, 280/732

(56) References Cited

U.S. PATENT DOCUMENTS

| | | | | |
|---|---|---|---|---|
| 4,989,897 A | * | 2/1991 | Takada | 280/728.3 |
| 5,082,310 A | * | 1/1992 | Bauer | 280/728.3 |
| 5,131,678 A | * | 7/1992 | Gardner et al. | |
| 5,172,931 A | * | 12/1992 | Baba et al. | 280/728.3 |
| 5,180,187 A | * | 1/1993 | Muller et al. | 280/728.3 |
| 5,186,490 A | * | 2/1993 | Adams et al. | 280/728.3 |
| 5,320,380 A | * | 6/1994 | Hamada et al. | |
| 5,338,059 A | * | 8/1994 | Inoue et al. | 200/61.54 |
| 5,395,668 A | * | 3/1995 | Ito et al. | |
| 5,437,470 A | * | 8/1995 | Terai et al. | 280/728.3 |
| 5,447,328 A | * | 9/1995 | Iannazzi et al. | |
| 5,522,616 A | * | 6/1996 | Bauer et al. | |
| 5,611,564 A | * | 3/1997 | Bauer | 280/728.3 |
| 5,615,908 A | * | 4/1997 | Phillion et al. | 280/728.3 |
| 5,626,357 A | * | 5/1997 | Leonard et al. | |
| 5,772,240 A | * | 6/1998 | Vavalidis | 280/728.3 |
| 5,779,262 A | * | 7/1998 | Totani et al. | |
| 5,913,534 A | * | 6/1999 | Klingauf | 280/728.3 |
| 5,941,557 A | * | 8/1999 | Mullins et al. | |
| 5,997,030 A | * | 12/1999 | Hannert et al. | 280/728.3 |
| 6,076,851 A | * | 6/2000 | Davis et al. | |
| 6,089,642 A | * | 7/2000 | Davis et al. | |
| 6,237,933 B1 | * | 5/2001 | Takahashi et al. | 280/728.3 |
| 6,250,669 B1 | * | 6/2001 | Ohmiya | 280/728.2 |
| 6,378,894 B1 | * | 4/2002 | Trevino et al. | 280/728.3 |

FOREIGN PATENT DOCUMENTS

| | | | | |
|---|---|---|---|---|
| JP | 0588176 A2 | * | 3/1994 | B60R/21/20 |
| JP | 11240404 A | * | 9/1999 | B60R/21/20 |

* cited by examiner

*Primary Examiner*—Paul N. Dickson
*Assistant Examiner*—Joselynn Y. Sliteris
(74) *Attorney, Agent, or Firm*—Wood, Phillips, Katz, Clark & Mortimer

(57) ABSTRACT

An air bag cover assembly having a core layer, a cushioning layer, and a door. The core layer has an opening through which an air bag which the air bag cover assembly operatively overlies extends as the air bag is changed from an undeployed state into a deployed state. The skin layer has oppositely facing forward and rear surfaces and is situated forwardly of the core layer. The door is changeable between a closed state and an open state. In the closed state, the door covers the core layer opening. The door has a weakening portion which separates as an incident of the air bag changing from the undeployed state into to the deployed state. The door has a first hinge with a curved portion which flexes to allow at least a first part of the door to pivot from a first position to a second position as an incident of the air bag changing from the undeployed state into the displayed state and the door changing from the closed state into the open state.

32 Claims, 5 Drawing Sheets

AIR BAG COVER ASSEMBLY

BACKGROUND OF THE INVENTION

1. Field of the Invention

This invention relates to air bags and, more particularly, to an air bag cover assembly which operatively overlies an air bag and through which the air bag can be extended as the air bag is changed from an undeployed state by inflation thereof into a deployed state.

2. Background Art

Air bags are commonly used in automobiles to protect occupants from impact forces as in the event of a collision. The air bag is normally in a collapsed, undeployed state. In the event that the automobile is involved in a collision, the air bag inflates to a deployed state. A door on an instrument panel which operatively overlies the air bag is opened by the force developed by the air bag during the inflation so that the air bag can extend through the instrument panel into the passenger compartment of the vehicle to a protective position. In one form, the instrument panel is equipped with a door which is hinged at one side so that the entire dimension of the door pivots at the hinge region. This design is potentially dangerous in that a relatively large door could be thrust against a passenger during air bag deployment. In a worse case, the moving door could force the passenger's head against a part of the vehicle, such as the front windshield thereon.

To address this problem, it is known to make the instrument panel door so that parts thereof open oppositely in a pivoting action. The smaller door parts represent less of a risk to the vehicle occupants upon deployment of the air bag.

It has also been a goal of designers of air bags to use a resin that has the ability to absorb shock upon impacting a rider. This minimizes the likelihood of injury resulting from deployment of the air bag.

Japanese Patent Laid-Open No. 129852/1999 is directed to an instrument panel over an air bag which is designed to address the above problems. The instrument panel consists of a core layer, a foamed layer, and a skin layer. The core layer has an opening through which the air bag extends as it is deployed. The core layer opening is closed by a door. The door is designed to absorb strain deformation caused by the difference in thermal expansion between the door and skin layer.

Upon deployment of the air bag, the door is repositioned and ruptures the foam layer and skin layer. As the air bag is deployed, the door has portions which pivot oppositely by reason of hinge parts which are formed by grooves in the door rearwardly of the core layer. As a result, the repositioning door is less likely to injure the vehicle occupants than if the door were made as a single pivoting piece. Further, the foamed material and skin layer are made with a resin material that has good shock absorbing properties. This also contributes to the safe operation of the overall system.

In the air bag system, such as that described above, there exists a risk that the air bag will not properly deploy under all environmental conditions. For safe operation, the air bag must be deployable reliably in both high and low temperature environments.

In the system disclosed in Japanese Patent Laid-Open No.129852/1999, the hinge structure is formed so that the thickness of the foamed layer between the hinge part and the skin layer is increased at the groove. With this construction, the foamed layer may inhibit inflation of the air bag. With the air bag inflated at low temperatures, the hinge part is prone to disconnecting, as a result of which the door may fully separate and become a dangerous projectile within the vehicle compartment.

While horizontal strain deformation for the skin layer and door may be absorbed by the foamed layer, deformation of the door under the force of the inflation of the air bag may not be absorbed. Accordingly, as shown in FIG. 9 herein, as expansion of the air bag 1 occurs in a low temperature environment, a tension may be applied to the skin layer 2 due to the deformation of the door parts 4, 5. This may cause generation of cracks 6 in the skin layer 2. This cracking occurs as the elastic limit of the skin layer is exceeded.

In a worse case, as the air bag of the type shown in Japanese Patent Laid-Open No.129852/1999 is expanded in a low temperature environment, the skin layer and door may fragment, with parts thereof being propelled potentially against the vehicle occupants. This may also inhibit proper expansion of the air bag.

Further, if the door cannot be consistently and reliably opened, the air bag may not properly inflate as a result of which the air bag does not afford the required protection to the occupants of a vehicle.

SUMMARY OF THE INVENTION

In one form, the invention is directed to an air bag cover assembly having a core layer, a cushioning layer, and a door. The core layer has an opening through which an air bag, which the air bag cover assembly operatively overlies, extends as the air bag is changed from an undeployed state into a deployed state. The skin layer has oppositely facing forward and rear surfaces and is situated forwardly of the core layer. The door is changeable between a closed state and an open state. In the closed state, the door covers the core layer opening. The door has a weakening portion which separates as an incident of the air bag changing from the undeployed state into the deployed state. The door has a first hinge with a curved portion which flexes to allow at least a first part of the door to pivot from a first position to a second position as an incident of the air bag changing from the undeployed state into the displayed state and the door changing from the closed state into the open state.

The weakening portion may consist of a groove.

In one form, the curved portion of the first hinge consists of a U-shaped forward surface and a U-shaped rear surface, each opening in a rear direction.

In one form, the curved portion of the first hinge has a thickness on the order of 1–2 mm.

In one form, the cushioning layer has a thickness between the curved portion of the first hinge and the skin layer on the order of 1–15 mm.

In one form, the door has a second part and a second hinge which flexes to allow the second part of the door to pivot from a third position to a fourth position as an incident of the air bag changing from the undeployed state into the deployed state.

The second hinge may have a curved portion which flexes as the second part of the door changes from the third position into the fourth position.

The curved portion of the second hinge may include a U-shaped forward surface and a U-shaped rear surface each opening in a rear direction.

The first and second door parts may pivot oppositely as the first door part moves from the first position into the second position and the second door part moves from the third position into the fourth position.

In one form, the groove has a V-shaped cross-sectional configuration.

The door may further include a forwardly projecting reinforcing rib.

In one form, the door has first and second reinforcing ribs and the groove resides between the first and second reinforcing ribs.

In one form, the skin layer has at least one groove therein at which the skin layer pivots as the door changes from the closed state into the open state.

The invention is also directed to an air bag cover assembly having a core layer, a skin layer, a cushioning layer, and a door. The core layer has an opening through which an air bag, which the air bag cover assembly operatively overlies, extends as the air bag is changed from an undeployed state into a deployed state. The skin layer has oppositely facing forward and rear surfaces and is situated forwardly of the core layer. The cushioning layer is between the core layer and the skin layer. The door is changeable between a closed state and an open state. The door in the closed state covers the core layer opening. The door has a weakening portion which separates as an incident of the air bag changing from the undeployed state into the deployed state. The door further has a first forwardly projecting reinforcing rib adjacent to the weakening portion.

In one form, the weakening portion has a groove and the door has a second forwardly projecting reinforcing rib with the groove residing between the first and second forwardly projecting reinforcing ribs.

In one form, the door has a first part that is pivotable from a first position into a second position as an incident of the air bag changing from the undeployed state into the deployed state and the door changing from the closed state into the open state.

In one form, the door has a second part that is pivotable from a third position into a fourth position as an incident of the air bag changing from the undeployed state into the deployed state and the door changing from the closed state into the open state.

In one form, the first door part has a reduced thickness portion defining a first hinge about which the first door part pivots in moving between the first and second positions.

The reduced thickness portion may have a curved shape.

In one form, the reduced thickness portion has a thickness on the order of 1–2 mm.

In one form, the cushioning layer has a thickness between the reduced thickness portion and a skin layer on the order of 1–15 mm.

DETAILED DESCRIPTION OF THE DRAWINGS

Figure 1:
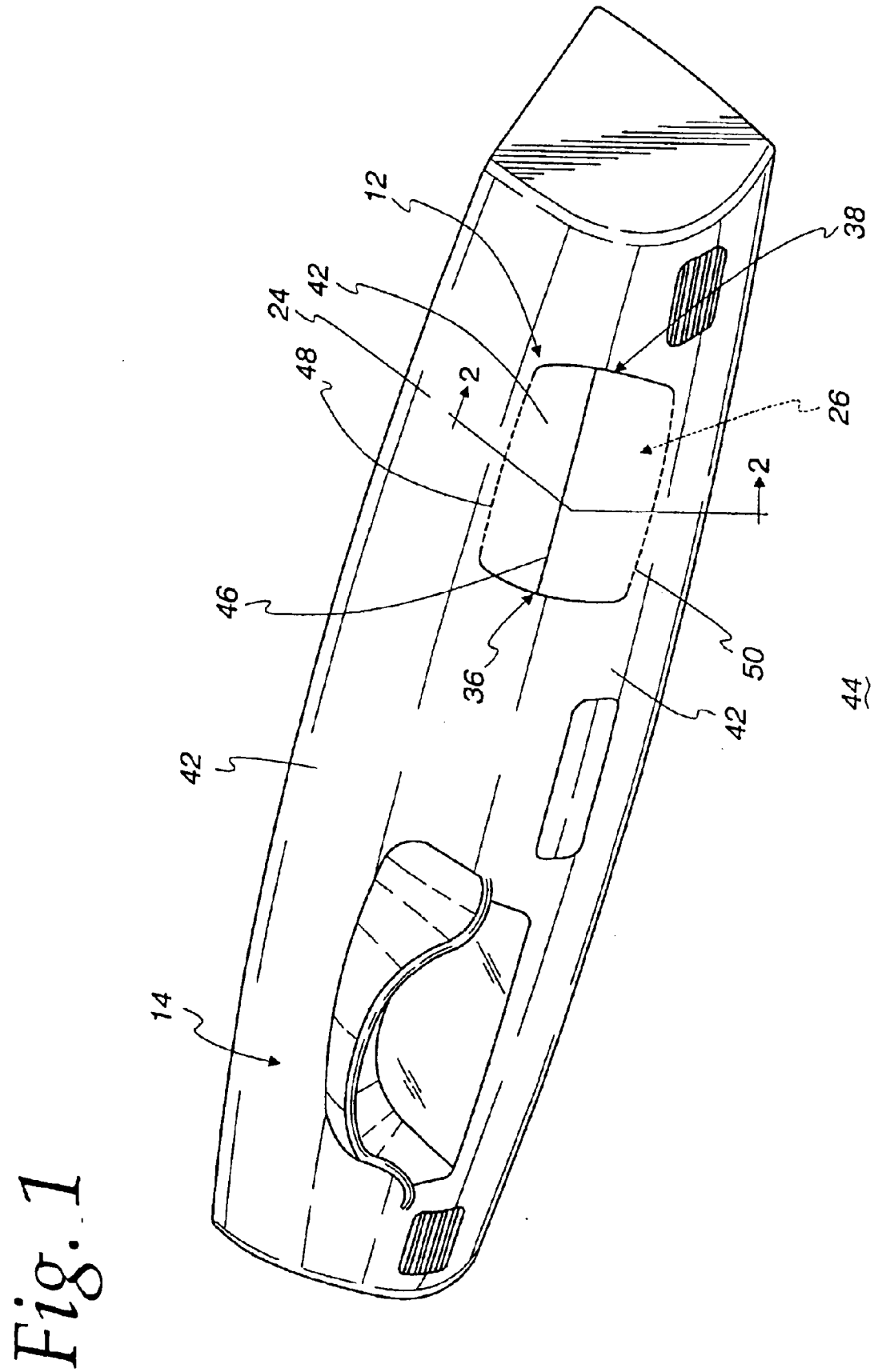
FIG. 1 is a perspective view of an instrument panel including a cover assembly operatively overlying an air bag and made according to the present invention.
Figure 2:
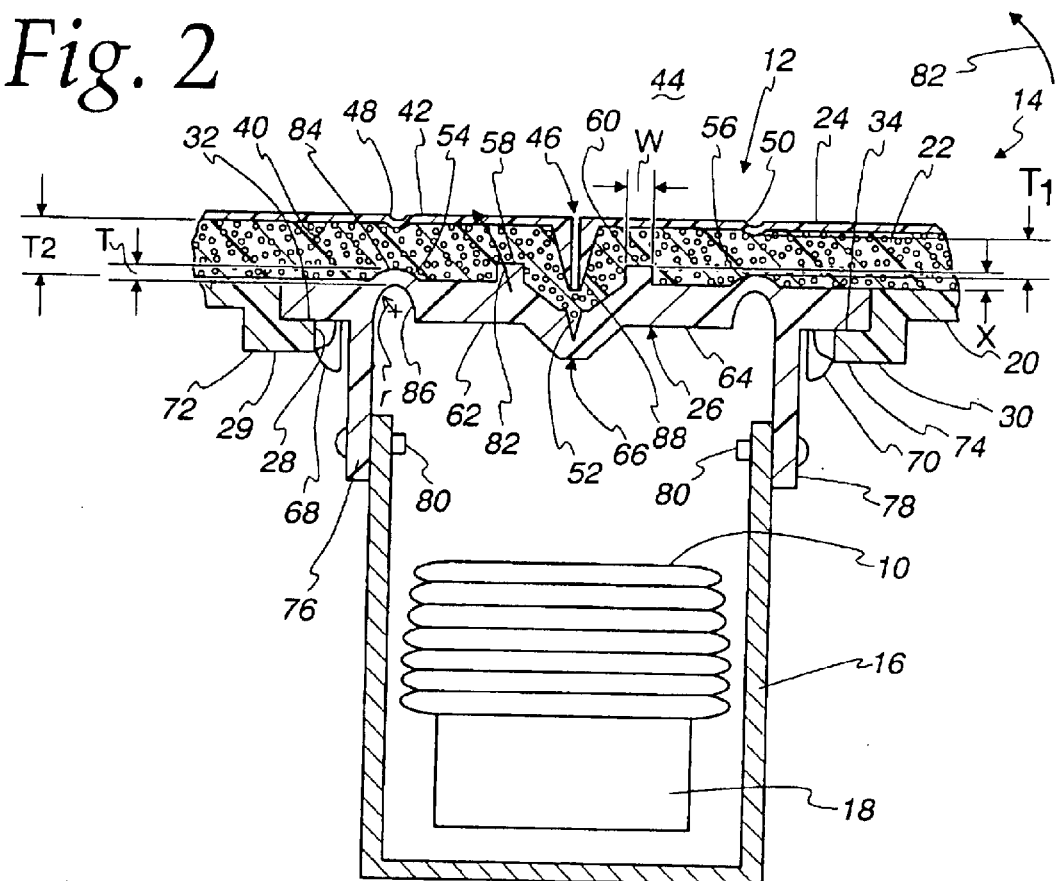
FIG. 2 is an enlarged, cross-sectional view of the instrument panel taken along line 2—2 of FIG. 1 with the air bag shown in an undeployed state.
Figure 3:
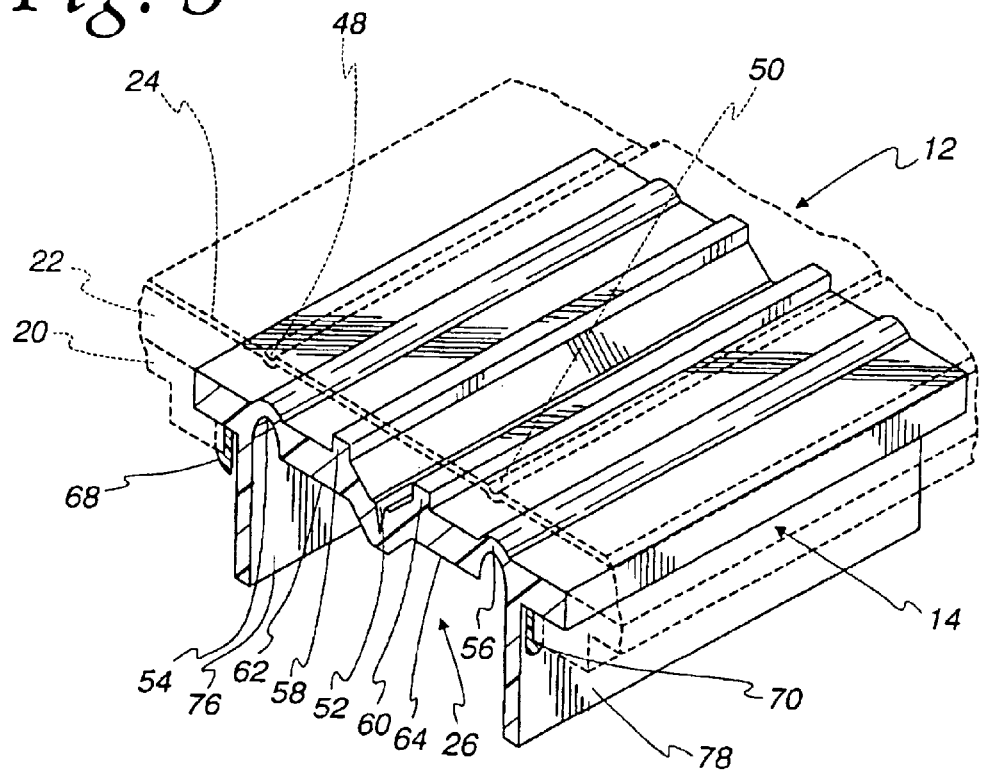
FIG. 3 is a fragmentary, perspective view of a door on the instrument panel shown in a closed state.

Referring initially to FIGS. 1–3, a cover assembly for operatively overlying an air bag 10 is shown at 12. The cover assembly 12 is part of an instrument panel 14 which is situated rearwardly of a front windshield on an automobile. The cover assembly 12 could be used in any environment and at any location where the protection of an air bag is desired. The air bag 10 resides within a module 16. The air bag 10 is operatively connected to a gas generator 18 which is responsible for inflating the air bag 10 from the undeployed state of FIG. 2, to a deployed state, wherein the inflated air bag 10 extends through the instrument panel 14.

The instrument panel 14 is formed by laminating a core layer 20, made of resin, a cushioning layer 22, made of a foamed material, and a skin layer 24, made of resin. The skin layer 24 is at the forward portion of the instrument panel 14, with the core layer 20 at the rear of the instrument panel 14. The cushioning layer 22 resides between the core layer 20 and skin layer 24. It should be understood that the directions front, rear, etc. are exemplary directions used only to identify specific relationship between the elements. The cover assembly 12 could, of course, be in any orientation and face any direction relative to a vehicle, or the like, within which it is incorporated. The instrument panel 14 further includes a door 26 that is changeable between a closed state, as shown in FIGS. 1–3, and an open state. The air bag 10 is shown in a partially deployed state in FIG. 4, with the door 26 in transition between the closed state and the open state.

The core layer 20 has an opening 28 therethrough through which the air bag 10 extends with the air bag 10 changed to the deployed state. The core layer 20 has laterally extending offsets 29, 30 at the opening 28, which offsets 29, 30 define steps 32, 34 at top and bottom of the opening 28. The steps 32, 34 extend the full lateral extent of the cover assembly 12 between opposite sides 36, 38 thereon.

The cushioning layer 22 fills the space between the door 26 and a rear surface 40 of the skin layer 24. The forward surface 42 of the skin layer 24 is exposed to the passenger compartment 44.

The skin layer 24 has an H-shaped break line 46, shown in solid lines in FIG. 1 on the cover assembly 12. The skin layer 24 has a groove consisting of grooved portions 48, 50 at the top and bottom of the cover assembly 12, respectively. Each groove portion 48, 50 has a generally U-shaped cross section, which opens forwardly. The groove portions 48, 50 project rearwardly into the cushioning layer 22. The groove portions 48, 50 facilitate pivoting repositioning of the door 26 as hereinafter described.

The door 26 consists of a laterally extending weakening portion 52, defined in a rearwardly offset portion of the door 26 having a U shape with a base and first and second legs opening in a forward direction from the base, laterally extending first and second hinges 54, 56 at the top and bottom of the cover assembly 12 each between generally coplanar surface parts of the door 26, and forwardly projecting first and second reinforcing ribs 58, 60 extending laterally and between which the groove 52 resides. The reinforcing has 58, 60 are embedded in the cushioning layer 22. The groove 52 has a V shape and opens forwardly with respect to the cover assembly 12.

The door 26 consists of first and second laterally extending parts 62, 64 joined by a frangible portion 66 at the rear of the groove 52. The door parts 62, 64 are supported upon the steps 32, 34 and cooperatively close the opening 28. The door 26 is secured to the core layer 20 by rib plates 68, 70 extending therefrom and bearing on rearwardly facing surfaces 72, 74 on the offsets 29, 30.

The door 26 further has mounting plates 76, 78 projecting from the offsets 29, 30. The mounting plates 76, 78 pass fully through the opening 28 and serve as a support for the module 16 which is mounted thereto through fasteners 80. With this arrangement, the undeployed air bag 10 resides on the rear side of the opening 28.

The groove 52 is centered between the reinforcing ribs 58, 60. The groove 52 extends laterally between the sides 36, 38 of the cover assembly 12 at a location rearwardly of the break line 46. The groove 52 also spans the offsets 29, 30 at each side 36, 38 and follows the same path as the break line 46 at the sides 36, 38. That is, the groove 52 has the same H-shaped configuration as the break line 46. Accordingly, rupture of the frangible portion 66 along the laterally extending portion and at the sides thereof allows the door parts 62, 64 to open upwardly and downwardly, respectively.

This opening movement is permitted by the first and second hinges 54, 56, each of which has a like construction. Exemplary hinge 54 is formed as one piece with the door part 62 and has a reduced thickness T which flexes as the first door part 62 pivots in the direction of the arrow 82 (FIG. 2) between the closed and open states for the door 26. The first hinge 54 is defined by a front surface 84 and a rear surface 86, each of which is U-shaped and opens in a rearward direction. A line bisecting the "U" of the front surface 84, also bisects the "U" of the rear surface 86 and extends through the groove portion 48. The first hinge 54 extends forwardly into the cushioning layer 22 so as to provide a localized reduction in the thickness thereof, shown as T1, which dimension is shown for the cushioning layer thickness between the correspondingly configured second hinge 56 and groove portion 50.

By reason of reducing the thickness of the cushioning layer 22, the hinges 54, 56 account for a predictable and consistent repositioning of the door parts 62, 64 in both high and low temperature environments. More particularly, to accomplish this, the radius r of the rear surface 86 is from 1.0 mm to 6.0 mm, and more preferably 3.0 to 6.0 mm. The thickness T1 of the cushioning layer 22 is from 1.0 to 15.0 mm.

If the radius of curvature r for of the surface 86 is 1.0 mm or less, the thickness T1 of the cushioning layer 22 may not be reduced sufficiently for the door 26 to predictably open. The thickness T1 of the cushioning layer 22 may thus inhibit the opening movement of the door parts 62, 64. On the other hand, if the radius of curvature r is 6.0 mm or more, the cushioning layer 22 may be excessively deformable. As a result, the door parts 62, 64 may be shifted under the foaming pressure of the material making up the cushioning layer 22 during manufacture. Typically, the door parts 62, 64 are placed in the closed position before the foamable material is directed between the door parts 62, 64 and the skin layer 24.

Preferably, the thickness T for each of the hinges 54, 56 is between 1.0 to 2.0 mm. If the thickness T is 1.0 mm or less, the hinges 54, 56 may rupture upon deployment of the air bag 10. On the other hand, if the thickness T is 2.0 mm or more, the door parts 62, 64 may not reliably open owing to the relative inelasticity of the hinges 54, 56.

It has been found that selecting and setting the radius r, and the thicknesses T, T1 within the stated ranges produces predictable and reliable opening of the door 26 upon deployment of the air bag in both high and low temperature environments. Further, the hinges 54, 56 have been found to remain intact so that the door parts 62, 64 do not separate in whole or in part so as to represent a dangerous projectile within the passenger compartment 44.

The reinforcing ribs 58, 60 are formed as one piece with the door parts 62, 64, are disposed adjacent to the break line 46, and project forwardly into the cushioning material 22. The reinforcing ribs 58, 60 extend along the lateral extent of the cover assembly 12.

With this construction, when the air bag 10 is deployed, the expansion force developed is concentrated in the vicinity of the break line 46 of the skin layer 24 at a location spaced forwardly from the rear edge 88 of the break line 46. This arrangement causes a positive and consistent rupturing of the skin layer 24 at the line 46. This minimizes the likelihood of crack formation in the skin layer 24 and potential separation of portions of the skin layer 24 with the air bag 10 deployed in both high and low temperature environments.

To best accomplish these objectives, it has been found that the reinforcing ribs 58, 60 should project forwardly into the cushioning layer 24 a distance (X) on the order of 6.0 mm. The width W of each reinforcing rib 58, 60 is preferably on the order of 3.0 mm.

The instrument panel 14 may be manufactured by attaching the door 26 to the core layer 20 using a mold (not shown) so that the opening 28 is closed by the door 26. The cushioning layer 22 is flowed into the gap between the skin layer 24 and the core layer 20 with the skin layer 24 and core layer 20 in the mold. The gap between the core layer 20 and skin layer 24 represents the thickness T2 of the cushioning layer 22, which is set on the order of 1.0 to 15.0 mm.

The core layer 20 may be made from resins such as polypropylene, acrylonitrile-butadiene-styrene copolymer, acrylonitrile-styrene copolymer, modified polyphenylene oxide, or styrene melaic anhydride copolymer. It is preferred to use thermoplastic such as thermoplastic olefin. The core layer 20 and the door 26 are preferably injection molded as one piece for cost control.

The cushioning layer 22 may be made from deformable materials that are formed by adding a blowing agent to vinyl chloride and olefinic thermoplastic elastomer, styrenic thermoplastic elastomer, urethanic thermoplastic elastomer, or polyester-type thermoplastic elastomer.

The skin layer 24 may be made from vinyl chloride resin, synthetic resin of vinyl chloride and acrylonitrile-butadiene-styrene copolymer, and olefinic thermoplastic. The skin layer 24 may be molded into a predetermined sheet shape by vacuum forming or slush molding.

It is preferred that each of the elements making up the instrument panel 14 be an olefin-type thermoplastic or an elastomer with good shock absorbing characteristics. By using the same materials for each of the elements making up the instrument panel 14, recycling is facilitated.

With each of the elements of the instrument panel 14 made from molded thermoplastics or elastomers, the door 26 can be consistently and reliably opened without cracking of the skin layer 24, or rupturing of the hinges 54, 56 upon deployment of the air bag 10.

When the air bag 10 is deployed in a low temperature environment, the skin layer 24 and door 26 become less extensible. Accordingly, the radius r of the surface 86, thickness T of the hinges 54, 56, and the thickness T2 of the cushioning layer 22 are selected as described above, and preferably with the reinforcing ribs 58, 60 having the configuration and dimension as also described above. As a result, the door 26 can be reliably and predictably opened with minimal fear that the door 26 will break apart, either by disconnection of the hinges 54, 56 or breaking up of the skin layer 24 as an incident of the air bag 10 being deployed, in either a hot or low temperature environment.

Figure 4:
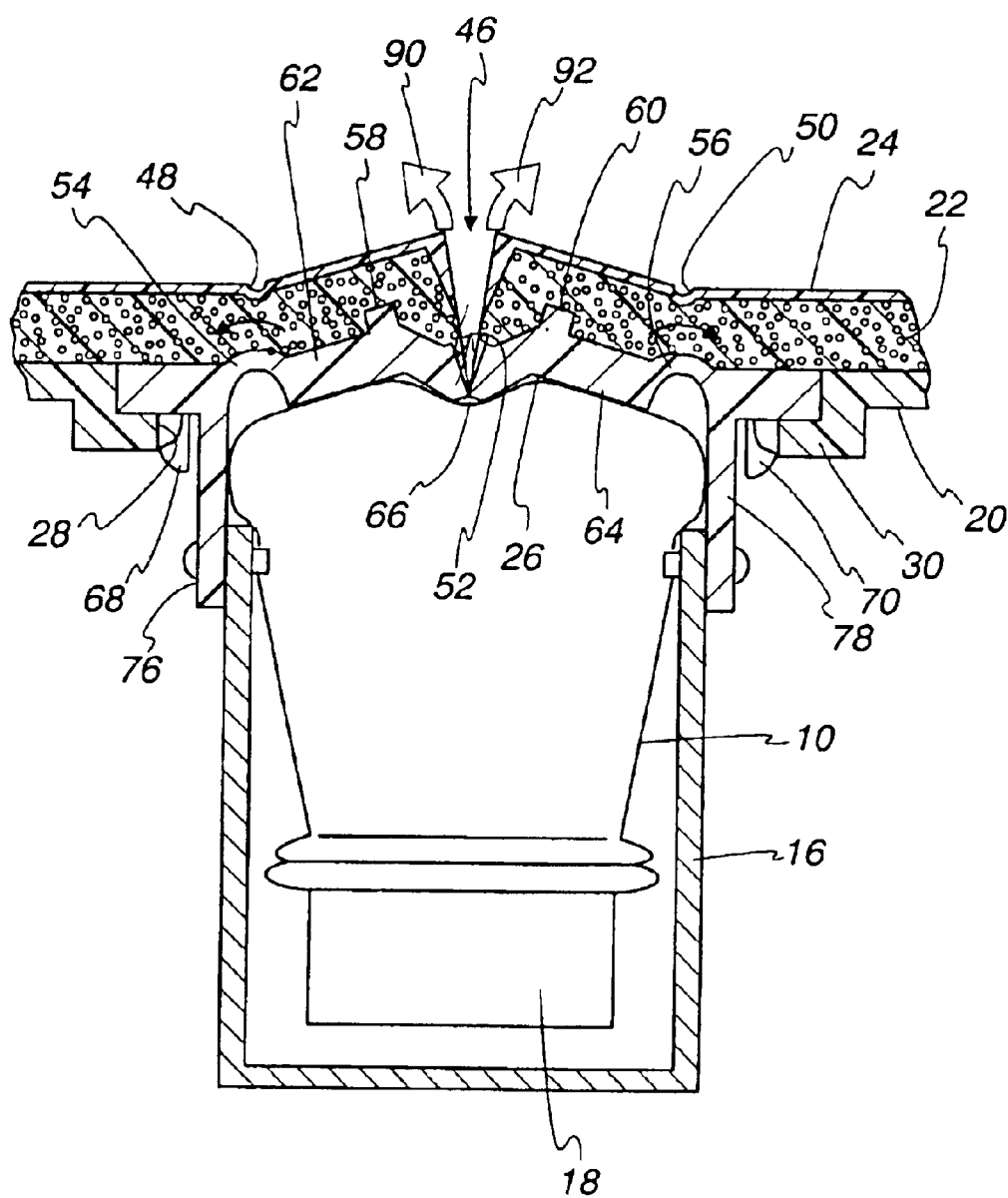
FIG. 4 is a view as in FIG. 2 with the air bag in a partially deployed state and the door in a partially open state.

The changing of the door 26 from the closed state to the open state will now be explained with respect to FIG. 4. As the vehicle with which the air bag 10 is associated is impacted, the air bag 10 is inflated by gas released from the generator 18. The pressure of the expanding air bag 10 causes the frangible portion 66 at the groove 52 to rupture. The rupturing progresses through to the cushioning layer 22 and to the skin layer 24 at the break line 46. Continued inflation causes the first door part 62 to pivot in the direction of the arrow 90 and the second door part 64 to pivot in the direction of the arrow 92 about their respective hinges 54, 56. The hinges 54, 56 flex to permit opening of the door parts 62, 64. Once fully deployed, the air bag 10 extends fully through the opening 28 and is exposed in the vehicle compartment 44.

The reinforcing ribs 58, 60 concentrate the expansion forces from the air bag at the break line 46 so that the skin layer 24 separates thereat without producing cracking of the skin layer 24 as might produce individual pieces that are propelled within the vehicle compartment 44, potentially dangerously against an occupant thereof.

The invention contemplate that the hinges 54, 56, of the same or similar construction as described herein, can be used without reinforcing ribs 58, 60 and also that reinforcing ribs 58, 60, as described above, can be used without making the hinges 54, 56 with the curved shape described.

Figure 5:
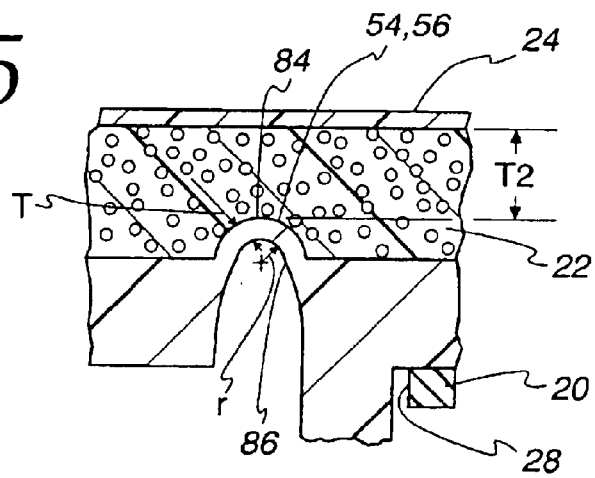
FIG. 5 is an enlarged, fragmentary, cross-sectional view of a part of the inventive instrument panel at a hinge for a part of the door.
Figure 6:
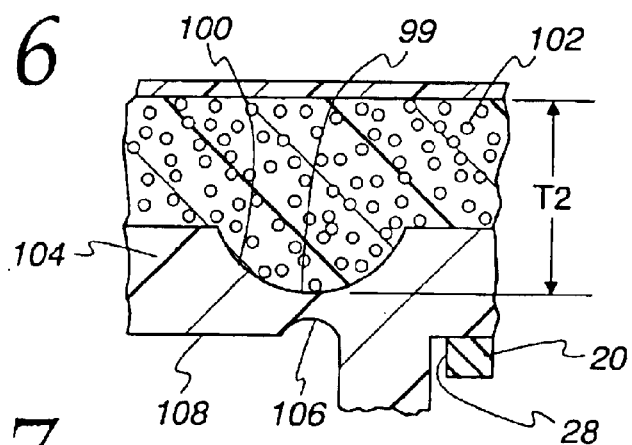
FIG. 6 is a view as in FIG. 5 for a comparative hinge example used for testing.
Figure 7:
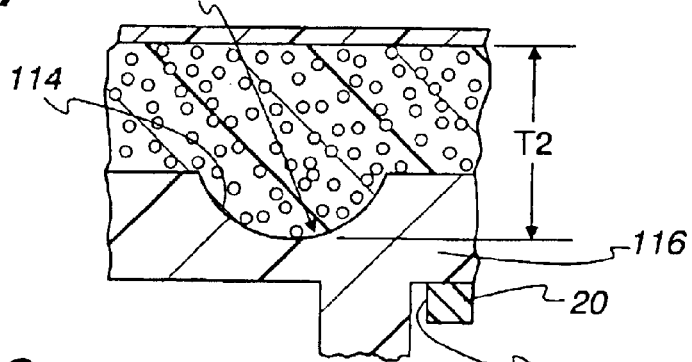
FIG. 7 is a view as in FIGS. 5 and 6 of another comparative hinge example.
Figure 8:
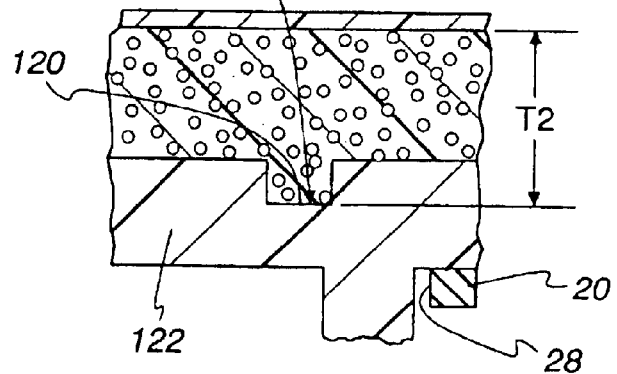
FIG. 8 is a view as in FIGS. 5–7 of still another comparative hinge example.
Figure 9:
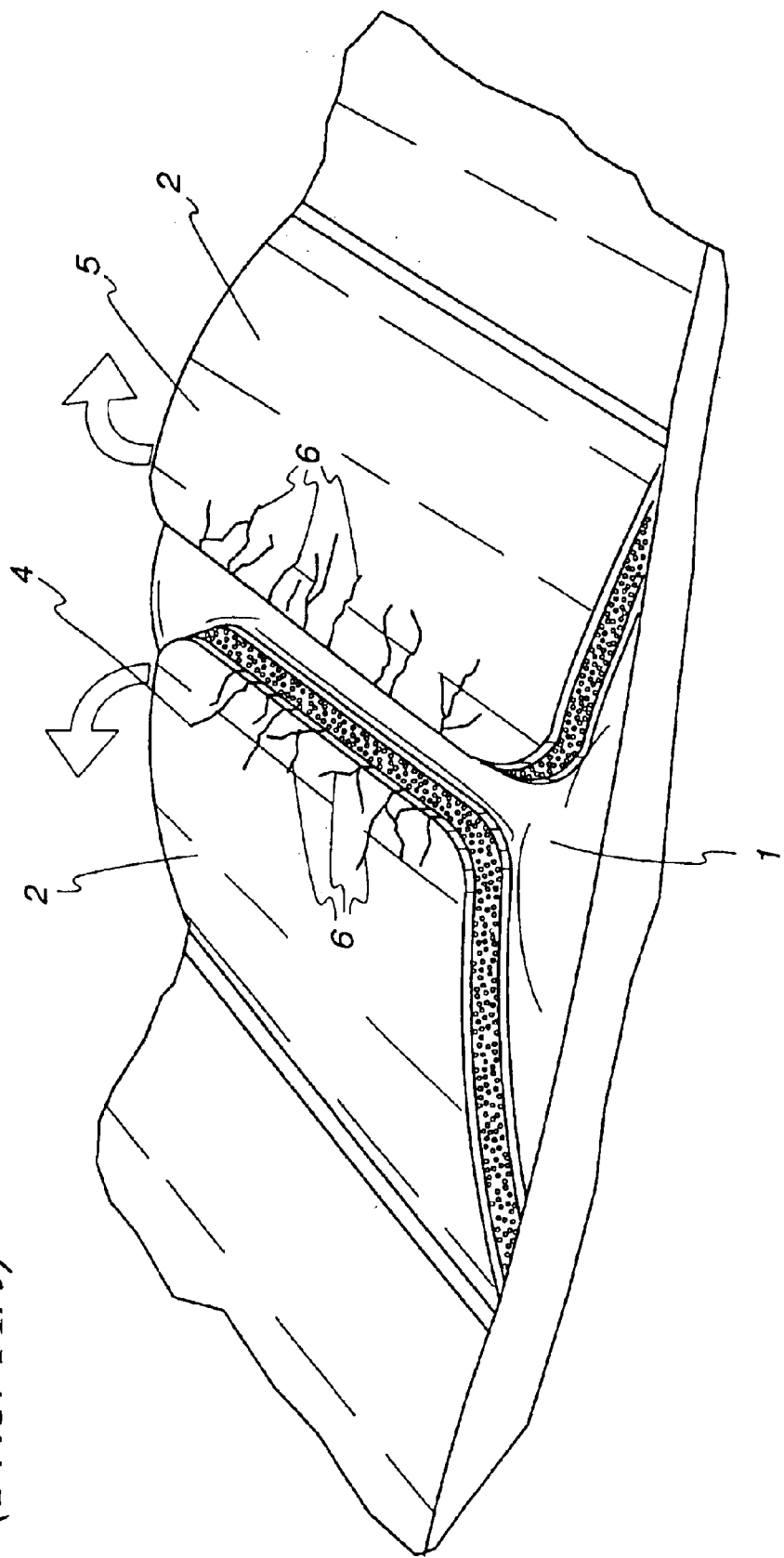
FIG. 9 is a fragmentary, perspective view of a cover assembly on a prior art instrument panel with a door thereon in a partially open state and with cracking developing in a skin layer thereon.

The operation of the inventive cover assembly 12, as shown in FIG. 5, was tested by comparison to cover assemblies with three different hinge designs in three comparative examples, as shown in FIGS. 6–8. The experiment was conducted under the following conditions. Three temperatures were utilized: a normal temperature of 23° C.; a low temperature of −35° C.; and a high temperature of 80° C. The materials for the core layer, the cushioning layer, the skin layer, and the door were olefinic thermoplastics, and elastomers with good shock absorbing characteristics. The hinge parts for the inventive example and comparative examples 1–3 are shown in FIGS. 5–8, respectively.

In FIG. 5, the inventive hinges 54, 56 were formed with a curved shape having surfaces 84, 86. The hinges 54, 56 protruded into the cushioning layer 22. The radius of r of the surface 86 was 1.5 mm. The thickness T of the hinges 54, 56 was 1.5 mm. The thickness T2 was 6.0 mm.

The hinge 99 of the comparative example 1, shown in FIG. 6, was defined by a curved groove 100 opening forwardly into the cushioning layer 102. The groove 100 reduced the thickness of the door 104. An oppositely opening groove 106 was formed in the rear surface 108 of the door 104. This arrangement defined the hinge 99 at a reduced thickness region between the grooves 100, 106.

In FIG. 7, a hinge 112 is shown for comparative example 2. The hinge 112 is defined by a groove 114 cut into the door 116 and opening forwardly.

A hinge 118 is shown for comparative example 3 in FIG. 8. The hinge 118 is defined by a rectangular groove 120 formed through a door 122 and opening in a forward direction.

The results of the testing are shown in Table 1, below.

TABLE 1

|  | Normal temperature (23° C.) | Low Temperature (−35° C.) | High Temperature (80° C.) |
| --- | --- | --- | --- |
| Inventive Example | ○ | ○ | ○ |
| Comparative Example 1 | ○ | Δ | ○ |
| Comparative Example 2 | ○ | X | ○ |
| Comparative Example 3 | X | X | ○ |

In this table, the symbol "○" indicates that the air bag door opened reliably so that the air bag could be expanded. The symbol "Δ" indicates that the air bag was only half opened and could not be properly expanded. The symbol "X" indicates that the hinges were disconnected and that the air bag door was fragmented.

In summary, as seen in Table 1, with the inventive example, the door opened reliably not only at the normal temperature but at high and low temperatures. On the other hand, with comparative example 1, while the door opened reliably at normal and high temperatures, it only half opened at the low temperature. The door of comparative example 2 reliably opened only at the high temperature, was only half opened at the normal temperature, and fragmented at the low temperature. The door in comparative example 3 could be opened reliably only at the high temperature and was scattered at the normal and low temperatures.

The door in comparative examples 1 and 2 could not be opened reliably because the thickness T2 of the cushioning layer between the skin layer and the hinges was increased so that the cushioning layer hindered opening of the air bag door. In comparative examples 2 and 3, it is believed that the air bag door was scattered because the grooves 114, 120 were curved to open towards the cushioning layer.

In comparative examples 1 and 3, the air bag could not be properly expanded at low temperatures. In comparative example 1, the air bag did not expand properly as a result of which a rider would not be properly protected by the air bag. With comparative examples 2 and 3, the air bag fragmented at the low temperature so that the propelled fragments might potentially dangerously contact an occupant of the vehicle.

The foregoing disclosure of specific embodiments is intended to be illustrative of the broad concepts comprehended by the invention.

What is claimed is:

1. In combination:
   (a) a core layer having an opening through which an air bag extends as the air bag is changed from an undeployed state into a deployed state; and
   (b) an air bag cover assembly which overlies the core layer opening, the air bag cover assembly comprising:
      a skin layer having oppositely facing forward and rear surfaces and situated forwardly of the core layer;
      a cushioning layer between the core layer and the skin layer; and
      a door that is separate from the cushioning layer and skin layer and changeable between a closed state and an open state, the door in the closed state covering the core layer opening,
      the door having a weakening portion which separates as an incident of the air bag changing from the undeployed state into the deployed state, the door comprising a first hinge having a curved portion which directly abuts to the cushioning layer and flexes to allow at least a first part of the door to pivot from a first position to a second position as an incident of the air bag changing from the undeployed state into the deployed state and the door changing from the closed state into the open state, the first hinge having a localized reduced thickness which facilitates flexing of the door at the first hinge, wherein the curved portion of the first hinge comprises a U-shaped forward surface and a U-shaped rear surface each opening in a rear direction and the U-shaped forward surface directly abuts to the cushioning layer, wherein the localized reduced thickness is defined between the U-shaped forward and rear surfaces.

2. The combination according to claim 1 wherein the weakening portion comprises a groove.

3. The combination according to claim 1 wherein the curved portion of the first hinge has a thickness on the order of 1–2 mm.

4. The combination according to claim 1 wherein the cushioning layer has a thickness between the curved portion of the first hinge and the skin layer on the order of 1–15 mm.

5. The combination according to claim 1 wherein the door comprises a second part and a second hinge which flexes to allow the second part of the door to pivot from a third position to a fourth position as an incident of the air bag changing from the undeployed state into the deployed state.

6. The combination according to claim 5 wherein the second hinge has a curved portion which flexes as the second part of the door changes from the third position into the fourth position.

7. The combination according to claim 6 wherein the curved portion of the second hinge comprises a U-shaped forward surface and a U-shaped rear surface each opening in a rear direction.

8. The combination according to claim 5 wherein the first and second door parts pivot oppositely as the first door part moves from the first position into the second position and the second door part moves from the third position into the fourth position.

9. The combination according to claim 2 wherein the groove has a V-shaped cross-sectional configuration.

10. The combination according to claim 1 wherein the door further comprises a forwardly projecting reinforcing rib.

11. The combination according to claim 2 wherein the door comprises first and second reinforcing ribs and the groove resides between the first and second reinforcing ribs.

12. The combination according to claim 1 wherein the skin layer has at least one groove therein at which the skin layer pivots as the door changes from the closed state into the open state.

13. In combination:
(a) a core layer having an opening through which an air bag extends as the air bag is changed from an undeployed state into a deployed state; and
(b) an air bag cover assembly which overlies the core layer opening, the air bag cover assembly comprising:
a skin layer having oppositely facing forward and rear surfaces and situated forwardly of the core layer and a break line;
a cushioning layer between the core layer and the skin layer; and
a door having a forward surface facing the rear surface of the skin layer, the door changeable between a closed state and an open state, the door in the closed state covering the core layer opening;
the door having a weakening portion offset rearwardly from the forward surface of the door which separates as an incident of the air bag changing from the undeployed state into the deployed state,
the door further comprising a first forwardly projecting reinforcing rib adjacent to the weakening portion and sufficiently close to the break line to cause a concentrated force generated by deployment of the air bag to be applied in the vicinity of the break line.

14. The combination according to claim 13 wherein the weakening portion comprises a groove, the door comprises a second forwardly projecting reinforcing rib, and the groove resides between the first and second forwardly projecting reinforcing ribs.

15. The combination according to claim 13 wherein the door comprises a first part that is pivotable from a first position into a second position as an incident of the air bag changing from the undeployed state into the deployed state and the door changing from the closed state into the open state.

16. The combination according to claim 15 wherein the door comprises a second part that is pivotable from a second position into a third position as an incident of the air bag changing from the undeployed state into the deployed state and the door changing from the closed state into the open state.

17. The combination according to claim 16 wherein the first door part has a reduced thickness portion defining a first hinge about which the first door part pivots in moving between the first and second positions.

18. The combination according to claim 17 wherein the reduced thickness portion has a curved shape.

19. The combination according to claim 17 wherein the reduced thickness portion has a thickness on the order of 1–2 mm.

20. The combination according to claim 19 wherein the cushioning layer has a thickness between the reduced thickness portion and the skin layer on the order of 1–15 mm.

21. In combination:
(a) a core layer having an opening through which an air bag extends as the air bag is changed from an undeployed state into a deployed state; and
(b) an air bag cover assembly which overlies the core layer opening, the air bag cover assembly comprising:
a skin layer having oppositely facing forward and rear surfaces and situated forwardly of the core layer;
a cushioning layer between the core layer and the skin layer; and
a door that is separate from the cushioning layer and skin layer and changeable between a closed state and an open state, the door in the closed state covering the core layer opening,
the door having a weakening portion which separates as an incident of the air bag changing from the undeployed state into the deployed state,
the door comprising a first hinge having a curved portion which flexes to allow at least a first part of the door to pivot from a first position to a second position as an incident of the air bag changing from the undeployed state into the deployed state and the door changing from the closed state into the open state,
wherein the curved portion of the first hinge comprises a U-shaped forward surface and a U-shaped rear surface each opening in a rear direction, wherein the curved portion of the first hinge has a thickness on the order of 1–2 mm, wherein the U-shaped forward surface resides between, and projects forwardly from, two substantially flat, co-planar, forwardly facing flat surface portions on the door.

22. The combination according to claim 11 wherein the cushioning layer has a thickness between the curved portion of the first hinge and the skin layer on the order of 1–15 mm.

23. In combination:
(a) a core layer having an opening through which an air bag extends as the air bag is changed from an undeployed state into a deployed state; and
(b) an air bag cover assembly which overlies the core layer opening, the air bag assembly comprising:
a skin layer having oppositely facing forward and rear surfaces and situated forwardly of the core layer;
a cushioning layer between the core layer and the skin layer; and
a door that is separate from the cushioning layer and skin layer and changeable between a closed state and an open state, the door in the closed state covering the core layer opening,
the door having a rearwardly offset portion and a weakening portion which separates as an incident of the air bag changing from the undeployed state into the deployed state,
the door comprising a first hinge having a curved portion which flexes to allow at least a first part of the door to pivot from a first position to a second position as an incident of the air bag changing from the undeployed state into the deployed state and the door changing from the closed state into the open state,
wherein the weakening portion comprises a V-shaped groove at the base of the rearwardly offset portion that opens in a forward direction.

24. In combination:
(a) a core layer having an opening through which an air bag extends as the air bag is changed from an undeployed state into a deployed state; and
(b) an air bag cover assembly which overlies the core layer opening, the air bag cover assembly comprising:
a skin layer having oppositely facing forward and rear surfaces and situated forwardly of the core layer;
a cushioning layer between the core layer and the skin layer; and
a door that is separate from the cushioning layer and skin layer and changeable between a closed state and an open state, the door in the closed state covering the core layer opening,
the door having a weakening portion which separates as an incident of the air bag changing from the undeployed state into the deployed state,
the door comprising a first hinge having a curved portion which flexes to allow at least a first part of the door to pivot from a first position to a second position as an incident of the air bag changing from the undeployed state into the deployed state and the door changing from the closed state into the open state,
wherein the door further comprises a rearwardly offset portion in which the weakening portion is formed, a forwardly facing surface and a discrete reinforcing rib which projects forwardly from the forwardly facing surface and abuts to the cushioning layer,
wherein the rearwardly offset portion of the door has a U shape with first and second legs opening in a forward direction and the reinforcing rib is located immediately adjacent to the first leg.

25. The combination according to claim 13 wherein the forwardly projecting reinforcing rib directly abuts to the cushioning layer.

26. The combination according to claim 13 wherein the forwardly projecting rib is embedded in the cushioning layer.

27. In combination:
(a) a core layer having an opening through which an air bag extends as the air bag is changed from an undeployed state into a deployed state; and
(b) an air bag cover assembly which overlies the core layer opening, the air bag cover assembly comprising:
a skin layer having oppositely facing forward and rear surfaces and situated forwardly of the core layer;
a cushioning layer between the core layer and the skin layer; and
a door that is separate from the cushioning layer and skin layer and changeable between a closed state and an open state, the door in the closed state covering the core layer opening,
the door having a rearwardly offset portion and a weakening in the rearwardly offset portion which separates as an incident of the air bag changing from the undeployed state into the deployed state,
the door comprising a first hinge having a curved portion which flexes to allow at least a first part of the door to pivot from a first position to a second position as an incident of the air bag changing from the undeployed state into the deployed state and the door changing from the closed state into the open state,
wherein the weakening comprises a V-shaped groove in the rearwardly offset portion that opens in a forward direction.

28. In combination:
(a) a core layer having an opening through which an air bag extends as the air bag is changed from an undeployed state into a deployed state; and
(b) a skin layer having oppositely facing forward and rear surfaces and situated forwardly of the core layer;
a cushioning layer between the core layer and the skin layer; and
a door that is separate from the cushioning layer and skin layer and changeable between a closed state and an open state, the door in the closed state covering the core layer opening,
the door having a weakening portion which separates as an incident of the air bag changing from the undeployed state into the deployed state,
the door comprising a first hinge disposed between two substantially coplanar surface parts of the door and having a curved portion which directly abuts to the cushioning layer and flexes to allow at least a first part of the door to pivot from a first position to a second position as an incident of the air bag changing from the undeployed state into the deployed state and the door changing from the closed state into the open state.

29. The combination according to claim 23 wherein the V-shaped groove converges to a point.

30. The combination according to claim 23 wherein the door has a rearwardly offset portion and a weakening portion in the rearwardly offset portion, the rearwardly offset portion is U-shaped with a base and first and second legs opening in a forward direction from the base, and the U-shaped groove is at the base of the rearwardly offset portion.

31. The combination according to claim 30 wherein the first and second legs are non-parallel to each other.

32. The combination according to claim 30 wherein the first and second legs converge in a rearward direction.

* * * * *